INVENTORS:
L. E. HOLLANDER, Jr.
G. A. S. WINGROVE
BY J. B. Burke
ATTORNEY

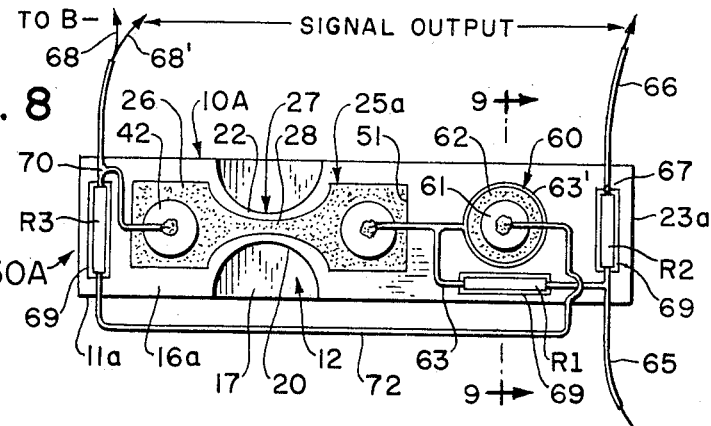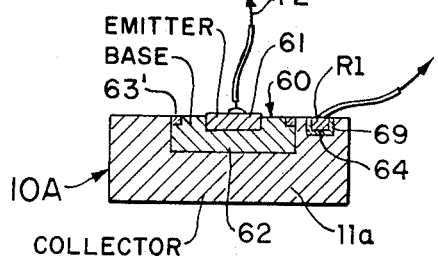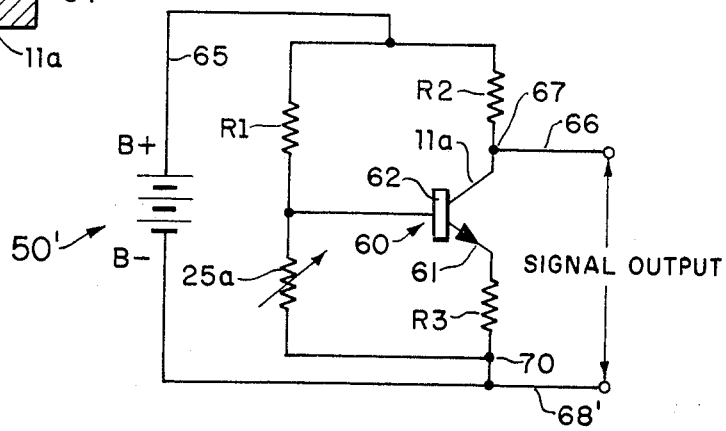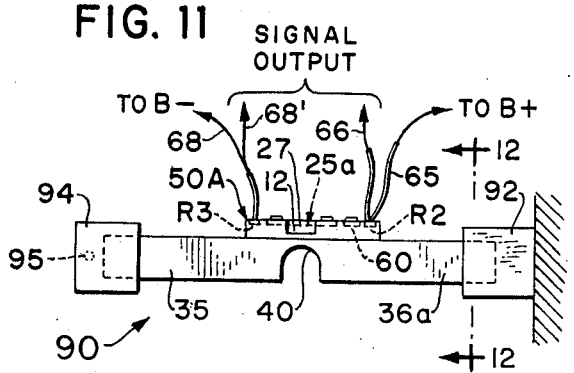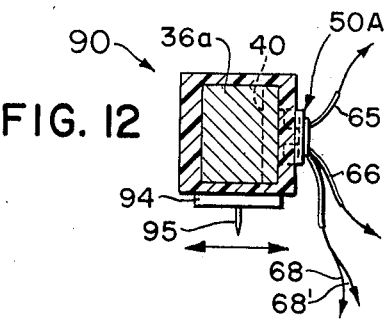

United States Patent Office 3,492,513
Patented Jan. 27, 1970

1

3,492,513
MESA T-BAR PIEZORESISTOR
Lewis E. Hollander, Jr., 21600 Stagecoach Road, Los Altos, Calif. 95030, and Gerald A. S. Wingrove, Indianapolis, Ind.; said Wingrove assignor to said Hollander
Filed July 27, 1967, Ser. No. 656,452
Int. Cl. H03k 3/26, 19/08
U.S. Cl. 307—308                    10 Claims

ABSTRACT OF THE DISCLOSURE

A chip or wafer of silicon or other piezoresistive crystalline material is formed with a central bar portion which is T-shaped in cross section. The chip has a diffused piezoresistive mesa layer extending along a free edge of the trunk of the "T-bar" section. Electrodes are applied to opposite ends of the diffused layer. A transistor amplifier and various circuit elements can be incorporated directly into the body of the chip and can be connected in circuit with the diffused piezoresistive layer.

---

The invention is directed at a piezoresistor having a novel structure.

Piezoresistive strain gauge elements of which those disclosed in U.S. Patent 3,084,300 are typical, have been made of bulk silicon crystals in dumbbell shape. The narrow necks of the crystals have been made by chemical etching. It is very difficult to make these piezoresistive devices in mass production to close manufacturing tolerances. Furthermore these bulk crystal strain gauge elements, no matter how carefully they are mounted, are very susceptible to breakage from forces applied in shear due to misalignment of either the crystals or their mounting structure with respect to applied forces. Furthermore a few degrees of misalignment can reduce yield strength significantly.

It has been proposed to fabricate piezoresistive strain gauge elements by use of epitaxially grown or diffused layers on the flat surface of a silicon crystal base. These elements generally have a stripe of diffused piezoresistive material as a layer on a bulk silicon block. Use of such strain gauge elements have been drastically limited because there is no convenient way of applying the stress to the piezoresistive layer without expending a large amount of mechanical energy in inactive areas of the base block, and in inactive ends of the layer where electrical lead wires are attached.

The present invention is directed at overcoming the above difficulties and disadvantages by providing a structure which affords mechanical amplification of stress by concentrating applied stress in a centrally located thin diffused piezoresistive region on a bulk crystal base, without wasting applied mechanical energy in end portions or sections of the bulk crystal where no electrical modulation is to be provided.

According to the invention, there is provided a bulk crystal chip or wafer having a central section in the form of a T-bar. A piezoresistive epitaxially grown layer or a diffused layer is formed in situ on a mesa along the thin free edge of a web which is the trunk or pedestal at one side of the T-bar section. The head of the T-bar section at the other side of the wafer can be bonded to a surface whose stress is to be measured, or it can be bonded to a transducer member subjected to stress. The sides of the web will be perpendicular to the head of the T-bar section. Considerable stress amplification will thus be attained at the mesa edge of the T-bar section due to leverage applied through the web which joins opposite end sections of the wafer. The wafer can be of n-type piezoresistive semiconductive materials and the diffused piezoresistor can be of p-type material, or vice versa. A p-n junction is defined between the body of the wafer and the piezoresistive layer so that the wafer can be hard soldered to any convenient metal carrier, transducer member or base surface to be subjected to stress, without short circuiting the piezoresistive layer. When stress is applied, stress amplification is obtained from the base surface area to the diffused piezoresistive area via the web of the T-bar section. The end portions of the wafer can be much wider than the web, so that these end portions are stiffened. Thus stress is minimized in these end portions of the wafer and in the end areas where the electrodes are attached. The T-bar device is essentially stiffened in the shear direction where the crystalline base is weakest. All bending forces applied to the device are translated into a longitudinal mode, providing maximum ultimate applicable yield strength.

An additional advantage of the present invention is that a transistor amplifier and associated circuitry can be incorporated directly into the crystalline wafer or chip, by readily available microcircuit building techniques. Thus in applications to phonograph cartridges, strain gauge assemblies and other transducer devices, electrical amplification can be included without any material increase in size of the piezoresistive device.

The present mesa T-bar piezoresistor has the following advantages over prior comparable piezoresistive devices:

(1) By providing a means for stress concentration in the central part of the diffused layer, a very high figure of merit is obtained.

(2) The ultimate noise level of the device is extremely low, lower than is possible of attainment with other crystalline strain gauges.

(3) The ultimate yield strength of the device is extremely high because of the reduction or elimination of shear stresses.

(4) A piezoresistive element, transistor and circuit elements can all be built on the same chip or wafer of semiconductor material, making the piezoresistive element an integral part of a transistorized amplifying circuit.

(5) A p-n junction is achieved which provides isolation of a piezoresistive element from a metal support for a crystalline chip or wafer bonded to the metal support by a hard solder joint.

(6) The piezoresistors can be made mass production techniques such as planar processes used to produce planar elements when fabricating transistors, with the addition of mesa etching to produce the mesa T-bars.

(7) The circuit elements built on the chip or wafer can be applied by mass production microcircuit building techniques.

(8) The piezoresistor can be made in large quantities at comparatively low cost.

In a preferred form of the device embodying the invention, a chip or wafer having a thickness of about 7 mils and composed of silicon or other piezoresistive crystalline material with proper orientation of crystalline axes, is provided with a central T-bar section. The length of the T-bar section will be located in the [111] crystalline direction. There will be a diffused, etched layer on the narrow surface of the trunk of the T-bar section having a resistivity of about 100 ohms per square. This mesa layer may be diffused to a depth yielding approximately 1 ohm cm. material. Such a device can be 20 mils wide, 30 mils long and 5 mils thick. Boron may be diffused to produce a p-type layer of 1 ohm cm. material on an originally n-type crystal of about ½ ohm cm. This will form a p-n barrier for convenient solder mounting of the wafer to a metal support. Electrodes will be applied to opposite ends of the diffused layer, by deposition of aluminum for example. A planar transistor can be embodied in the silicon chip. A section of the chip approximately 2 mils wide or about 10% of the total width will be etched to form the T-bar section. The T-bar assembly will concentrate stress in the diffused piezoresistive region and will substantially eliminate stresses at the electrodes and in the area where the planar transistor is located. The T-bar structure prevents stressing the electrode areas. Microcircuit elements such as resistors can be built on the chip or wafer beyond opposite ends of the piezoresistor in the unstressed ends of the chip. The T-bar structure eliminates shear stresses and places the sensitive piezoresistive filament in a pure bending mode from longitudinally applied stresses. The diffused layer is mesaed on the T-bar section for stress amplification. A mesa region is reserved for transistor diffusion. It is possible to sculpture the T-bar structure so as to obtain maximum stress amplification. The height of the T-bar section establishes the stress amplification ratio for the assembly. The device has all the advantages of a diffused layer piezoresistive device, with a p-n junction isolating effect allowing the device to be soldered by gold or other utectic solder to a metal surface without short circuiting the piezoresistor.

The unique features of the device thus produced include the formation of the mesa at the diffusion region to create stress amplification, and incorporation directly on the same device of a transistor and associated electrical components for electrical amplification. Furthermore the device is rigid in shear. The p-n layer of the device is at a relatively light carrier density, having approximately $10^{17}$ atoms per cubic centimeter. This is the region of maximum piezoresistance effect. It contrasts with previously known diffused layer devices which have $10^{20}$ or higher atoms per cubic centimeter doping concentration. Such devices have a gage factor of about 40 as compared to a gage factor of 175 attainable with a device as described herein.

In manufacturing the device, procedures employed generally in the semiconductor and microcircuit manufacturing arts can be employed. They may involve polishing the original wafer, oxidation, masking, etching, diffusion, aluminizing, electroding, lapping, etc. The device can have a gage factor in the bending mode which can exceed 500, the gage factor being $$GF = \frac{\Delta v}{\Delta x}$$

where $\Delta x$ is change in strain and $\Delta v$ is change in voltage. The high gage factor is a multiple of the mechanical advantage of a T-bar device in bending which is approximately a factor of 5 for the device described herein, times the inherent gage factor of 1 ohm cm. p-type silicon material, which is 175.

The invention will be described in further detail with reference to the drawings, wherein:

FIG. 8 is a plan view of another assembly including a mesa T-bar piezoresistor on a semiconductive wafer with an associated transistor amplifier circuit on the wafer.

FIG. 9 is a further enlarged cross sectional view taken on line 9—9 of FIG. 8.

FIG. 10 is a diagram of a circuit including elements of the assembly of FIG. 8.

FIG. 11 is a plan view of a phonograph transducer employing the mesa T-bar piezoresistor assembly of FIGS. 8, 9.

FIG. 12 is an enlarged vertical sectional view taken on line 12—12 of FIG. 11.

Figure 1:
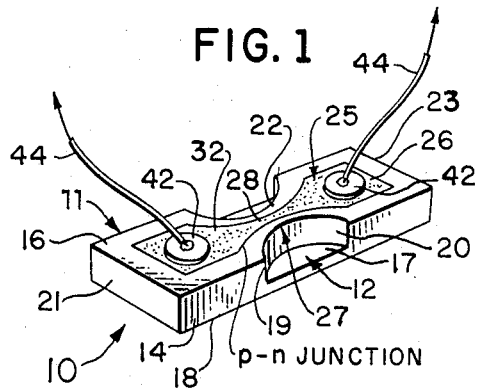
FIG. 1 is a perspective view on an enlarged scale of a mesa T-bar piezoresistor embodying the invention.

Referring first to FIGS. 1-4, there is shown a mesa T-bar piezoresistor 10 including a generally rectangular flat wafer 11 made of semiconductive material such as n-type silicon doped with phosphorous or other suitable dopant. Inwardly extending notches or recesses 12 are formed in opposite narrow sides 14 of the wafer. The notches are open at one broad side 16 of the wafer and have flat inner walls 17 spaced slightly from the other broad side 18 of the wafer. The ends 19 of concave walls 20 of the notches are spaced inwardly of opposite end faces 21, 23 of the wafer. The notches extend inwardly of opposite sides 14 so that walls 20 define a thin longitudinally extending central web or partition 27. The center section of the wafer is thus T-shaped in cross section at all cross sections between ends 19 of the notches. This constitutes a T-bar structure.

At one side 16 of the wafer is an integrally formed diffused or epitaxially grown layer 25 of p-type material produced by doping the surface of the silicon wafer with boron or other suitable dopant. The layer 25 is dumbbell shaped in plan view. It has broad generally rectangular end areas overlying rectangular end sections of the wafer. The end areas 26 of layer 25 are connected by a narrow neck 28 located centrally of web 27. Neck 28 is located on the free mesa edge 22 of the web. Layer 25 is coplanar with side 16 of the wafer. Neck 28 is joined to the end areas 26 by integral tapered transition sections 32. The interface 34 between layer 25 and wafer 11 defines a p-n junction. Electrodes 41 are applied to end areas 26 of layer 25. Lead wires 44 are soldered to the electrodes.

Figure 5:
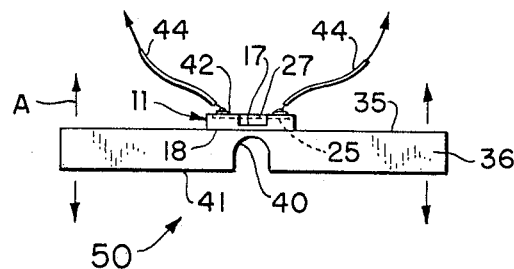
FIG. 5 is a side view of an assembly including a mesa T-bar piezoresistor and supporting beam.
Figure 2:
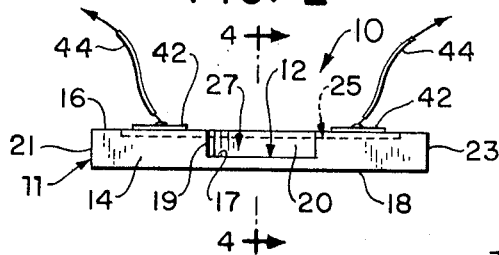
FIG. 2 is a side view of the piezoresistor of FIG. 1.
Figure 6:
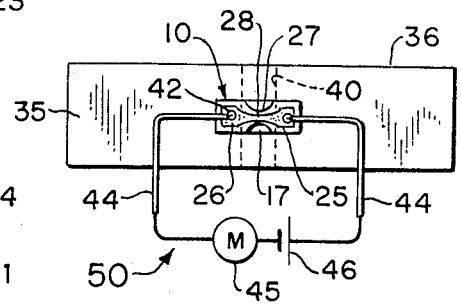
FIG. 6 is a top view of the assembly of FIG. 5.
Figure 3:
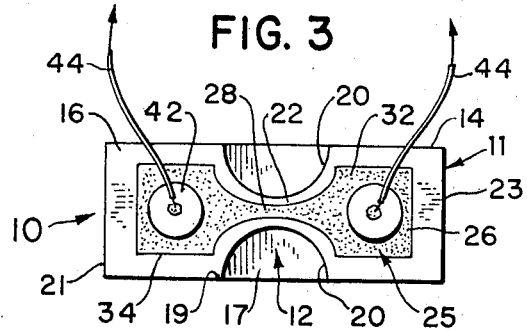
FIG. 3 is a plan view of the piezoresistor.
Figure 7:
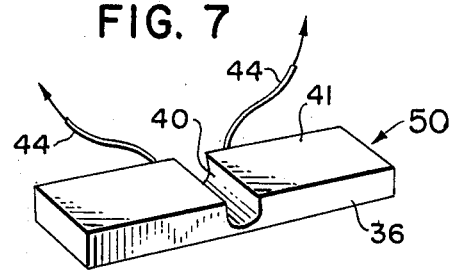
FIG. 7 is a perspective view of the assembly of FIGS. 5 and 6 in an inverted position.
Figure 4:
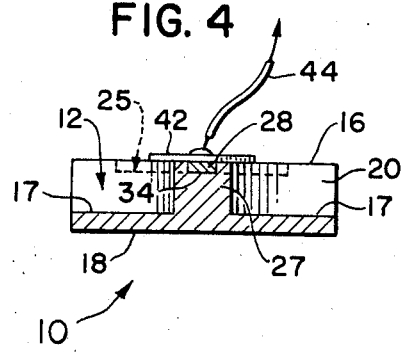
FIG. 4 is an enlarged cross sectional view taken on line 4—4 of FIG. 2.

FIGS. 5-7 show an assembly 50 including piezoresistor 10, as above described, secured to one side 35 of a slotted beam 36. The piezoresistor can be soldered or otherwise secured. Beam 36 has a transverse groove 40 at its other side 41 to impart flexibility to the beam. Piezoresistor 10 is mounted longitudinally of the beam with side 18 secured to side 35 of the beam perpendicularly to groove 40. Thin electrodes 42 are applied to opposite end areas 26 of the layer 25 with lead wires 44 attached to electrodes 42. Web 27 is perpendicular to groove 40 and extends longitudinally of the beam. It will be apparent that when the beam is stressed as indicated by arrows A, substantially all stress applied to the piezoresistor will be concentrated at the web 27 which forms the trunk portion of the T-bar section of the wafer. This stress is greatest at neck 28 due to mechanical amplification by the web, while negligible stress is applied at end areas 26. No mechanical force is wasted in the massive rectangular end sections of the wafer. Maximum change in electrical resistance occurs therefore at the filamentary neck 28. This change in resistance can be measured by a calibrated meter 45 connected in series with battery 46 and lead wires 44 as shown in FIG. 6. Piezoresistor 10 serves as a transducer and stress amplifier in assembly 50. The assembly thus can serve as a stress or strain gauge device.

FIGS. 8 and 9 show an assembly 50A including a mesa T-bar piezoresistor 10A which is generally similar to piezoresistor 10, and corresponding parts are identically numbered. Wafer 11a is made of n-type semiconductive material. Layer 25a is of p-type epitaxially grown or diffused piezoresistive material. The piezoresistive layer terminates short of end 23a of the wafer and leaves sufficient space on side 16a for mounting microresistors R1, R2. Located between end 23a of the wafer and end 51 of layer 25a is an n-p-n planar junction transistor amplifier 60. This amplifier includes an n-type emitter 61 formed in p-type base 62. The base is formed in wafer 11a which serves as an n-type collector. Another microresistor R3 is applied to side 16a of the wafer just beyond the other end of layer 25a. The resistors may be embedded in recesses 64 formed in side 16a of the wafer as best shown in FIG. 9. The resistors can be insulated by nonconductive films 69 from the wafer. Metal conductors 63 connect the several parts together. Conductor 63' surrounds base 62. Lead wire 65 is connected to the junction of resistors R1 and R2. Lead wire 66 is connected to joint 67 where one end of resistor R2 is connected to the wafer-collector 11a. Lead wires 68 and 68' are connected to junction 70 between one end of resistor R3 and electrode 42a at one end of layer 25a. The other end of resistor R3 is connected by wire 72 to emitter 61. Electrode 42b at the other end of layer 25a is connected to resistor R1 and base 62.

FIG. 10 shows circuit 50' which employs assembly 50A. Lead wires 65 and 69 are connected to direct current source 80. Wire 68' connects to wire 68. Emitter 61 is connected to output lead wire 68' via resistor R3. Resistors R1, R2 and R3 determine the voltage applied to base 62, collector 11a and emitter 61 respectively. The piezoresistor 25a and resistor R3 are joined at junction point 70. Output lead wire 68 is connected to collector 11a at junction point 67. The direct current flows through piezoresistor 25a via resistor R1. Any change in resistance of piezoresistor 25a results in a change of the voltage across points 67, 70. When a stress is applied to wafer 11a, mechanical stress amplification occurs at web 27 of the T-bar section and results in a change in resistance of the piezoresistor 25a at neck 28. The resulting change in current passed by the piezoresistor is amplified by the transistor 60 and appears as a signal at output lead wires 66, 68'.

FIGS. 11 and 12 show assembly 50A of FIGS. 8, 9 employed in a phonograph transducer 90. This transducer employs flexible slotted beam 36a. One end of the beam is secured in a fixed support 92 in a cantilever arrangement, so that the other end of the beam is free to move. A compliant sleeve or cap 94 carrying a phonograph needle or stylus 95 is mounted on the other end of the beam for tracking a lateral groove in a phonograph record.

The mesa T-bar piezoresistor assembly 50A is mounted on side 35 of the beam opposite from groove 40. When stylus 95 is deflected laterally, the filamentary neck of the piezoresistive layer is stressed. Corresponding amplified electrical signals appear at lead wires 67, 68'.

Mesa T-bar piezoresistors as described above can be fabricated by conventional planar techniques employed in making transistors. The process can be started with an n-type wafer of silicon material having a resistivity of about one ohm centimer which corresponds to a doping level of about $1.5 \times 10^{16}$ carriers per cubic centimeter. For a device of 1000 ohms, the surface resistivity will be approximately 100 ohms per square.

The n-type wafer is then subjected to polishing, oxiding, masking, etching, predisposition, diffusion, remasking, applying electrodes, lapping and applying lead wires. At the oxiding step, an oxide film will be grown to portect the base material during deep etching when notches 12 will be formed to outline the T-bar mesas. A pattern of a plurality of p-type piezoresistors will be diffused into one side of the wafer on the T-bar mesas during the diffusion process. The diffused material is preferably boron to create a layer of active regions of p-type material. The ends of the diffused piezoresistive p-type regions will be aluminized to form electrodes. The electrodes will be alloyed to facilitate attachment of the lead wires. The wafer can then be scribed to define individual chips, and the wafer will then be broken to form the individual T-bar piezoresistors. These piezoresistors can then be mounted on beams or frame elements to form transducer assemblies such as shown in FIGS. 5-7, 11 and 12.

The doping level of $10^{17}$ carriers or less per cc. for p-type silicon in the [111] direction is required to obtain a high gage factor. Greater temperature independence can be achieved by increasing the doping level. However for maximum gage factor, a doping level of $10^{17}$ carriers or less per cc. is necessary to obtain a layer of requisite thickness and characteristics on a wafer of uniform 1 ohm centimeter sensitivity.

The mesa T-bar piezoresistors described above can be formed with n-type layers, in which case the base wafers will be made of p-type material. The arrangement of resistors and transistor elements of FIGS. 8-10 is only exemplary. Other arrangements can be built. The mesa T-bar piezoresistors described have very wide utility in the field of transducer technology. As one example, a piezoresistor can be bonded to a cantilever type of support as shown in FIGS. 11, 12. The device can then be used in a phonograph cartridge, microphone, pressure gage, and other types of displacement, vibration, acceleration, or acoustic measuring transducers. The cost of manufacture will be less and the quality will be better than is attainable with present known types of piezoresistive devices. The invention greatly enhances the utility of piezoresistive stress and strain responsive elements as compared to magnetic, piezoelectric or other types of transducers.

The above described mesa T-bar piezoresistors fulfill a long felt need in the art. They make it possible to use planar diffused or epitaxially grown thin active piezoresistive layers by applying them to properly shaped semiconductive supports. The piezoresistor assemblies are relatively simple and inexpensive to manufacture. The invention provides stress amplification in the desired portion of the piezoresistors. The invention makes it possible to embody on the same semiconductive chip or wafer of crystalline material a piezoresistor, a transistor and associated circuitry.

Although several embodiments of the invention have been described, this has been done only by way of illustration. This is not to be regarded as limited to the examples presented. The invention is to be construed as coextensive with the scope of the broadest of the appended claims.

What is claimed and sought to be protected by Letters Patent is:

1. A piezoresistive mesa T-bar transducer, comprising a semiconductive generally rectangular crystalline wafer having flat opposite sides, said wafer having a pair of spaced lateral notches extending from one side and terminating short of the other side at a central section of the wafer, so that said central section is T-shaped throughout in cross section while opposite end sections of the wafer are rectangular in cross section, said notches defining a longitudinally extending web disposed perpendicular to the opposite sides of the wafer, said web joining the end sections of the wafer, said web having a free mesa edge forming part of said one side; and a thin, elongated piezoresistive layer integrally formed in situ on said one side of the wafer and extendinging longitudinally thereof, said layer having a central portion extending along the mesa on said free edge of the web, said layer having opposite end portions terminating on the end sections of the wafer, the other side of the wafer being free for attachment to a surface subject to stresses, whereby stresses applied to the wafer are substantially concentrated at the web in a longitudinal mode and are mechanically amplified by the web to change the electrical resistance of the central portion of the layer while the end portions of the layer and end sections of the wafer remain substantially unstressed.

2. A piezoresistive transducer as recited in claim 1, wherein said layer is a planar diffusion having uniform surface resistivity, and wherein said layer comprises a doped semiconductive material having not more than $10^{20}$ carriers per cubic centimeter to maximize change in resistance of said layer when said stresses are applied thereto.

3. A piezoresistive transducer as recited in claim 2, wherein said material is silicon and wherein the dopant of the silicon in said layers is boron.

4. A piezoresistive transducer as recited in claim 1, wherein the semiconductive layer comprises p-type silicon having not more than $10^{20}$ boron carriers per cubic centimeter uniformly distributed, so that the layer has substantially uniform resistivity throughout; and wherein said wafer comprises n-type silicon.

5. A piezoresistive transducer as recited in claim 1, wherein said layer is a planar diffusion having uniform surface resistivity.

6. A piezoresistive transducer as recited in claim 1, wherein said layer is epitaxial with a crystalline axis orientation of [111] disposed longitudinally of the wafer and web to maximize change in resistance of said layer when subjected to mechanical stresses.

7. A piezoresistive transducer as recited in claim 1, wherein said layer and said wafer comprise semiconductive materials of two different types, said types being p-type and n-type, so that a p-n junction exists between the layer and wafer, whereby said layer is effectively isolated electrically from the wafer.

8. A piezoresistive transducer as recited in claim 1, wherein the opposite end portions of said layer are wider than said central portion; and electrodes applied to said end portions of the layer for passing electric current therethrough.

9. A piezoresistive transducer as recited in claim 8, further comprising a transistor having a collector, base and emitter all integrally formed with the wafer; and electrical conductors connecting the electrodes of the piezoresistive layer in circuit with the collector, base and emitter so that the transistor amplifies electric current changes in said circuit caused by changes in electrical resistance of said layer when stressed.

10. A piezoresistive transducer as recited in claim 9, further comprising microresistors applied to said wafer and connected in circuit with the piezoresistive layer, collector, base and emitter to complete said circuit.

References Cited

UNITED STATES PATENTS

| | | | |
|---|---|---|---|
| 3,277,698 | 10/1966 | Mason | 73—88.5 |
| 3,329,023 | 7/1967 | Kurtz et al. | 307—308 X |
| 3,351,880 | 11/1967 | Wilner | 317—234 X |

JOHN W. HUCKERT, Primary Examiner

R. F. POLISSACK, Assistant Examiner

U.S. Cl. X.R.

307—303; 310—8.1, 9.5, 9.6; 317—234, 235; 338—2, 47